US012174571B2

(12) United States Patent
Tanaka et al.

(10) Patent No.: US 12,174,571 B2
(45) Date of Patent: Dec. 24, 2024

(54) FIXING BELT INCLUDING LAYER OF POLYIMIDE AND SPECIFIC FILLER, FIXING DEVICE INCLUDING THE FIXING BELT, AND IMAGE FORMING APPARATUS INCLUDING THE FIXING DEVICE

(71) Applicant: FUJIFILM Business Innovation Corp., Tokyo (JP)

(72) Inventors: Hiroaki Tanaka, Kanagawa (JP); Ryohei Yoshikawa, Kanagawa (JP); Kenji Kajiwara, Kanagawa (JP); Taiki Nagamatsu, Kanagawa (JP); Tomotake Inagaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/455,268

(22) Filed: Aug. 24, 2023

(65) Prior Publication Data

US 2024/0329579 A1 Oct. 3, 2024

(30) Foreign Application Priority Data

Mar. 28, 2023 (JP) ................................. 2023-051959

(51) Int. Cl.
*G03G 15/20* (2006.01)

(52) U.S. Cl.
CPC ..... *G03G 15/2057* (2013.01); *G03G 15/2064* (2013.01); *G03G 2215/2038* (2013.01)

(58) Field of Classification Search
USPC .......................................................... 399/333
See application file for complete search history.

(56) References Cited

U.S. PATENT DOCUMENTS

2015/0252242 A1* 9/2015 Pham ....................... C08K 3/38
252/75

FOREIGN PATENT DOCUMENTS

| | | | |
|---|---|---|---|
| JP | 2003-257592 A | 9/2003 | |
| JP | 2012-213900 A | 11/2012 | |
| JP | 2015-168783 A | 9/2015 | |
| JP | 2016-124908 A | 7/2016 | |
| JP | 6057001 B1 | 1/2017 | |
| JP | 2018-155985 A | 10/2018 | |
| WO | WO-2008044643 A1 * | 4/2008 | ........... B29C 41/085 |

* cited by examiner

*Primary Examiner* — Quana Grainger
(74) *Attorney, Agent, or Firm* — Sughrue Mion, PLLC

(57) ABSTRACT

A fixing belt includes a substrate layer that contains polyimide and a filler containing a spherical filler and a cleavable flat plate-shaped filler, in which a total amount of the filler is less than 40% by volume with respect to the substrate layer.

20 Claims, 4 Drawing Sheets

FIXING BELT INCLUDING LAYER OF POLYIMIDE AND SPECIFIC FILLER, FIXING DEVICE INCLUDING THE FIXING BELT, AND IMAGE FORMING APPARATUS INCLUDING THE FIXING DEVICE

CROSS-REFERENCE TO RELATED APPLICATIONS

This application is based on and claims priority under 35 USC 119 from Japanese Patent Application No. 2023-051959 filed Mar. 28, 2023.

BACKGROUND

(i) Technical Field

The present invention relates to a fixing belt, a fixing device, and an image forming apparatus.

(ii) Related Art

In an image forming apparatus (such as a copy machine, a facsimile machine, or a printer) using an electrophotographic method, a fixing belt for fixing a toner image formed on a recording medium to the recording medium is used.

JP2003-257592A discloses "a heating device that has a belt, a heater fixed and supported on the inside of the belt, a heater holding member fixing and supporting the heater, and a pressure member forming a nip portion with the heater, and introduces a material to be heated to the nip portion and sandwiches and transports the material to be heated together with the belt such that the heat of the heater is applied to the material to be heated, in which a high thermal conductive member that has a higher thermal conductivity compared to the heater holding member and is in contact with the heater is fixed and supported on the inner surface side of the belt, and at least a part of the high thermal conductive member is arranged on the outside of the nip portion in the transport direction of the material to be heated".

JP2018-155958A discloses "a fixing device having a heating portion that rotates and fixes a toner image on a recording medium, a pressure portion that applies pressure to the heating portion and rotates, and a potential difference-applying means that applies a potential difference between the pressure portion and the heating portion such that a potential of the pressure portion is higher than a potential of the heating portion".

JP6057001B discloses "a fixing device having an endless belt that comes into contact with a developer image on a recording medium at a nip portion, a heat source that is provided on the inside of the belt and emits radiant heat, a heat transfer member that includes a contact portion coming into contact with the inner peripheral surface being a part of the belt in a circumferential direction and on the side opposite to the nip portion with respect to a position of a rotation center of the belt, absorbs the radiant heat from the heat source, and transfers the heat to the belt, and a deformation means that is deformed when a temperature of the contact portion exceeds a preset temperature such that at least a part of the contact portion separates from the belt".

SUMMARY

In a case where an attempt is made to enable a fixing belt of the related art to maintain thermal conductivity, the sliding properties between the inner peripheral surface of the belt (more specifically, the inner peripheral surface of a substrate layer) and a pressing member for pressing the belt on an opposing member tend to deteriorate. Aspects of non-limiting embodiments of the present disclosure relate to a fixing belt that includes a substrate layer containing polyimide and a filler containing a spherical filler and a cleavable flat plate-shaped filler, and outperforms a fixing belt in which the total amount of the filler is more than 40% by volume with respect to the substrate layer in terms of both the thermal conductivity and sliding properties.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

Specific means for achieving the above object include the following aspects.

According to an aspect of the present disclosure, there is provided a fixing belt including a substrate layer that contains polyimide and a filler containing a spherical filler and a cleavable flat plate-shaped filler, in which a total amount of the filler is less than 40% by volume with respect to the substrate layer.

BRIEF DESCRIPTION OF THE DRAWINGS

Exemplary embodiment(s) of the present invention will be described in detail based on the following figures, wherein.

DETAILED DESCRIPTION

Figure 1:
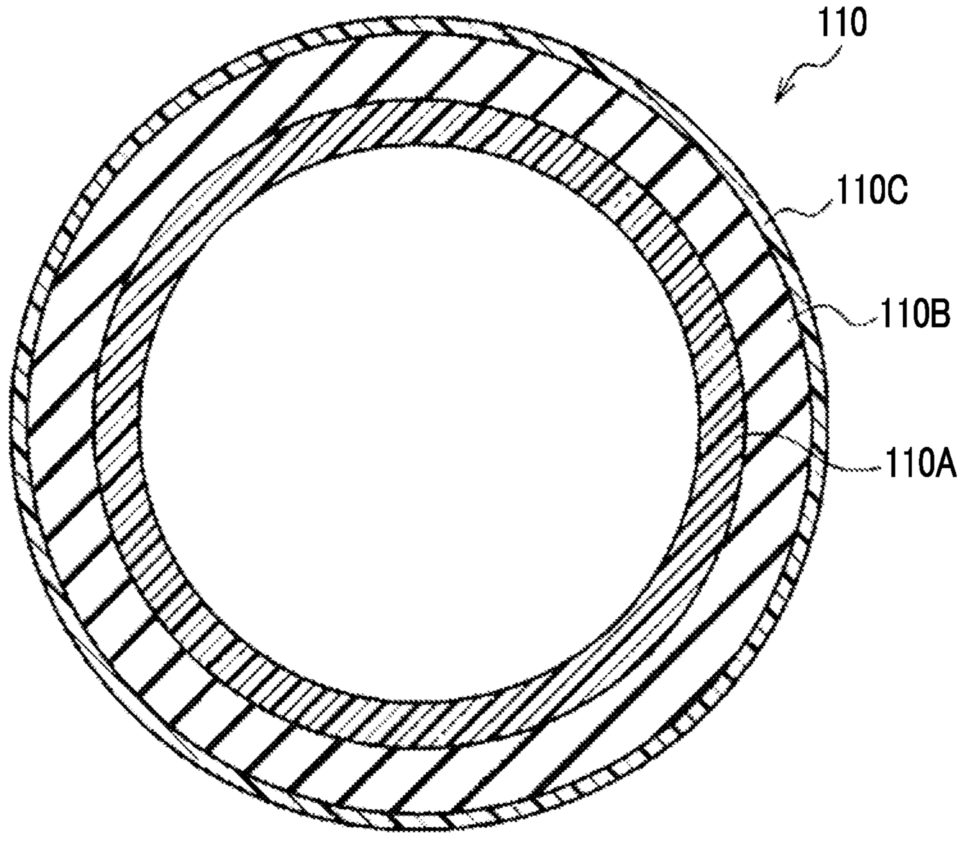
FIG. 1 is a schematic cross-sectional view showing an example of a fixing belt according to the present exemplary embodiment.

The exemplary embodiments as an example of the present invention will be described below. The following descriptions and examples merely illustrate exemplary embodiments, and do not limit the scope of the exemplary embodiments.

Regarding the ranges of numerical values described in stages in the present specification, the upper limit or lower limit of a range of numerical values may be replaced with the upper limit or lower limit of another range of numerical values described in stages.

Furthermore, in the present specification, the upper limit or lower limit of a range of numerical values may be replaced with values described in examples.

In the present specification, each component may include two or more kind of corresponding substances.

In a case where the amount of each component in a composition is mentioned in the present specification, and there are two or more kinds of substances corresponding to each component in the composition, unless otherwise specified, the amount of each component means the total amount of two or more kinds of the substances present in the composition.

Fixing Belt

The fixing belt according to the present exemplary embodiment includes a substrate layer that contains polyimide and a filler containing a spherical filler and a cleavable flat plate-shaped filler, in which a total amount of the filler is less than 40% by volume with respect to the substrate layer.

In the related art, as a technique for improving the sliding properties of a fixing belt, adding a cleavable flat plate-shaped filler to a substrate layer is known. However, because the flat plate-shaped filler in the substrate layer is aligned at a level with the thickness direction of the fixing belt of the related art, the flat plate-shaped filler impedes the thermal conductive path, and the thermal conductivity tends to deteriorate.

Regarding the above problem, studies have been conducted on a technique of incorporating a needle-shaped filler to the substrate layer in addition to the flat plate-shaped filler such that the flat plate-shaped filler is inhibited from being aligned at a level with the thickness direction of the belt. However, in this case, even though the thermal conduction characteristics are improved, due to the needle-shaped filler contained in abrasion powder which is generated in a case where the inner peripheral surface of the belt (more specifically, the inner peripheral surface of the substrate layer) and a pressing member for pressing the belt on an opposing member slide on each other, the sliding properties tend to deteriorate. That is, in the fixing belt of the related art, there is a trade-off relationship between the thermal conductivity and the sliding properties.

Having the above configuration, the fixing belt according to the present exemplary embodiment is excellent in both the thermal conductivity and sliding properties. The reason is presumed as follows.

The fixing belt according to the present exemplary embodiment includes a substrate layer that contains polyimide and a filler containing a spherical filler and a cleavable flat plate-shaped filler in a predetermined range. Therefore, in the substrate layer, the spherical filler is properly interposed between a plurality of flat plate-shaped fillers, which inhibits the flat plate-shaped fillers from being aligned at a level with the thickness direction of the belt. As a result, the alignment of fillers does not impede the thermal conductive path, resulting in excellent thermal conductivity and excellent sliding properties.

Hereinafter, the fixing belt according to the present exemplary embodiment will be described with reference to FIG. 1.

FIG. 1 is a schematic cross-sectional view showing an example of the fixing belt according to the present exemplary embodiment.

A fixing belt 110 shown in FIG. 1 has a substrate layer 110A, an elastic layer 110B provided on the substrate layer 110A, and a release layer 110C provided on the elastic layer 110B.

The substrate layer 110A has polyimide and a filler containing a spherical filler and a cleavable flat plate-shaped filler, in which the total amount of the filler is less than 40% by volume with respect to the substrate layer.

The layer configuration of the fixing belt 110 according to the present exemplary embodiment is not limited to the layer configuration shown in FIG. 1. The fixing belt 110 may not have at least one of the elastic layer 110B or the release layer 110C, or may consist of only the substrate layer 110A without both the elastic layer 110B and the release layer 110C.

The fixing belt 110 according to the present exemplary embodiment may have a layer configuration in which a metal layer and a protective layer for the metal layer are interposed between the substrate layer 110A and the elastic layer 110B, a layer configuration in which an adhesive layer is interposed between the substrate layer 110A and the elastic layer 110B, a layer configuration in which an adhesive layer is interposed between the elastic layer 110B and the release layer 110C, or a layer configuration obtained by combining the above layer configurations.

Hereinafter, the constituent components of the fixing belt according to the present exemplary embodiment will be specifically described. Note that the reference numerals will not be described.

Substrate Layer

The substrate layer has polyimide and a filler containing a spherical filler and a cleavable flat plate-shaped filler (hereinafter, also simply called "flat plate-shaped filler). As necessary, the substrate layer may further contain other additives in addition to the polyimide and the filler.

Filler

The filler contains a spherical filler and a cleavable flat plate-shaped filler.

Spherical Filler

The spherical filler is not particularly limited as long as it has a spherical shape, and is, for example, preferably a filler having an aspect ratio (major axis length/minor axis length) of 1 or more and 1.1 or less. Conceptually, the spherical filler includes not only a perfect sphere but also an elliptical sphere.

In a case where the substrate layer contains the spherical filler, the spherical filler is interposed between a plurality of flat plate-shaped fillers in the substrate layer, which inhibits the flat plate-shaped fillers from being aligned at a level with the outer peripheral surface. As a result, the thermal conductive path in the substrate layer is not impeded, resulting in excellent thermal conductivity.

In the present exemplary embodiment, the aspect ratio means a ratio (major axis length/minor axis length) of the major axis length (that is, the maximum diameter) to the minor axis length of the filler. The major axis length means the maximum diameter of the filler (that is, the maximum length of a straight line drawn to connect two arbitrary points on the contour of a cross section of the filler). On the other hand, the minor axis length means the length of the longest axis among the axes in a direction orthogonal to an extension of the major axis of the filler.

The spherical filler is not particularly limited as long as it satisfies the above aspect ratio. Examples of the spherical filler include a carbon material such as acetylene black, graphite, graphitized carbon black, or non-graphitized carbon black; a metal nitride such as aluminum nitride, silicon nitride, boron nitride, cerium nitride, or magnesium nitride, and the like. One spherical filler may be used alone, or two or more spherical fillers may be used in combination.

For example, the spherical filler preferably contains a carbon material, and more preferably contains at least one of acetylene black or graphitized carbon black, among the above.

For example, the carbon material (for instance, more preferably at least one of acetylene black or graphitized carbon black) is preferable because the carbon material is efficiently interposed as a spherical filler between a plurality of flat plate-shaped fillers and has excellent thermal conductivity.

The average particle size of the spherical filler is, for example, preferably 25 nm or more, more preferably 25 nm or more and 200 nm or less, and even more preferably 30 nm or more and 160 nm or less. In a case where the average particle size of the spherical filler is 25 nm or more, the spherical filler is likely to be more efficiently interposed between a plurality of flat plate-shaped fillers in the substrate layer, and the thermal conductivity is further improved. On the other hand, in a case where the average particle size of the spherical filler is 200 nm or less, it is likely that the spherical filler and the flat plate-shaped filler will be inhibited from being separately aligned in the substrate layer, and the spherical filler is likely to be more efficiently interposed between a plurality of flat plate-shaped fillers. Therefore, the thermal conductivity is further improved.

The average particle size and aspect ratio of the spherical filler are determined as follows.

A section is obtained from the substrate layer, 100 primary particles of the spherical filler in the substrate layer are observed with a scanning electron microscope (SEM) device, image analysis is performed on the spherical filler that is in a state of primary particles or aggregated particles, the maximum diameter and minimum diameter are measured for each particle, and an equivalent sphere diameter is determined from the mean thereof. A 50% diameter (D50p) in a number-based cumulative frequency of the obtained equivalent sphere diameters is defined as an average particle size (that is, a number-average particle size) of particles of the thermal conductive material.

The aspect ratio of the spherical filler can be obtained by defining the aspect ratio as a ratio (major axis length/minor axis length) of the major axis length (that is, the maximum diameter) to the minor axis length of each of the particles.

The content of the spherical filler with respect to the substrate layer is, for example, preferably 35% by volume or less, more preferably 5% by volume or more and 30% by volume or less, and even more preferably 10% by volume or more and 30% by volume or less.

Flat Plate-Shaped Filler

The flat plate-shaped filler is not particularly limited as long as it has a flat plate shape and is cleavable. For example, in the flat plate-shaped filler, an aspect ratio (thickness direction/flat plate direction) of a thickness direction to a flat plate direction is preferably 1,000 or more and 5,000 or less, more preferably 1,700 or more and 5,000 or less, and even more preferably 1,700 or more and 4,000 or less.

The aspect ratio of the thickness direction to the flat plate direction in the flat plate-shaped filler is determined by obtaining a section from the substrate layer, observing 100 primary particles of the flat plate-shaped filler in the substrate layer with a scanning electron microscope (SEM) device, performing image analysis on the flat plate-shaped filler that is in a state of primary particles or aggregated particles, and measuring the maximum diameter and thickness for each particle.

The aspect ratio of the flat plate-shaped filler can be obtained by defining the aspect ratio as a ratio (major axis length/minor axis length) of the major axis length (that is, the maximum diameter) to the minor axis length (that is, the thickness) of each of the particles.

Conceptually, the flat plate-shaped filler also includes a scale-shaped filler.

In a case where the flat plate-shaped filler is incorporated into the substrate layer, due to the cleavage of the filler, lubricity is imparted to the inner peripheral surface of the substrate layer, resulting in excellent sliding properties.

The flat plate-shaped filler is not particularly limited as long as it satisfies the above aspect ratio and is cleavable. Examples of the flat plate-shaped filler include a carbon material such as single-layer graphene, multilayer graphene, graphene nanoplatelets, or graphite; a metal nitride such as aluminum nitride, silicon nitride, boron nitride (for example, preferably hexagonal boron nitride), cerium nitride, or magnesium nitride; and the like. One flat plate-shaped filler may be used alone, or two or more flat plate-shaped fillers may be used in combination.

Among the above, for example, the flat plate-shaped filler preferably contain at least one of a layered or fibrous carbon material or a metal oxide, more preferably contain at least one material selected from the group consisting of carbon nanotubes (single-walled carbon nanotubes, multi-walled carbon nanotubes, and the like), graphene nanoplatelets, graphite, and hexagonal boron nitride, and even more preferably contain at least one material selected from the group consisting of graphene nanoplatelets, graphite, and hexagonal boron nitride.

The average primary particle size of the flat plate-shaped filler is, for example, preferably 10,000 nm or less, more preferably 100 nm or more and 10,000 nm or less, and even more preferably 500 nm or more and 5,000 nm or less. In a case where the average primary particle size of the flat plate-shaped filler is 10,000 nm or less, it is likely that the flat plate-shaped filler will be further inhibited from being aligned at a level with the outer peripheral surface in the substrate layer. On the other hand, in a case where the average primary particle size of the flat plate-shaped filler is 100 nm or more, the deterioration of cleavability is suppressed, and the sliding properties are further improved.

The average primary particle size of the flat plate-shaped filler is determined as follows.

A section is obtained from the substrate layer, 100 primary particles of the flat plate-shaped filler in the substrate layer are observed with a scanning electron microscope (SEM) device, image analysis is performed on the flat plate-shaped filler that is in a state of primary particles, the maximum diameter and minimum diameter is measured for each particle, and an equivalent sphere diameter is determined from the mean thereof. A 50% diameter (D50p) in a number-based cumulative frequency of the obtained equivalent sphere diameters is defined as an average primary particle size (that is, a number-average primary particle size) of the flat plate-shaped filler.

The content of the flat plate-shaped filler with respect to the total amount of the filler containing the spherical filler and the flat plate-shaped filler is, for example, preferably 10% by mass or more and 65% by mass or less, more preferably 15% by mass or more and 60% by mass or less, and even more preferably 20% by mass or more and 60% by mass or less.

The total amount filler containing the spherical filler and the cleavable flat plate-shaped filler with respect to the substrate layer is, for example, less than 40% by volume, preferably 1% by mass or more and 38% by mass or less, and more preferably 2% by mass or more and 35% by mass or less.

The volume ratio of the flat plate-shaped filler to the spherical filler (flat plate-shaped filler/spherical filler) is, for example, preferably 0.10 or more and 3.00 or less, more preferably 0.15 or more and 2.00 or less, and even more preferably 0.20 or more and 1.00 or less.

The content of the flat plate-shaped filler with respect to the substrate layer is, for example, preferably 35% by volume or less, more preferably 1% by volume or more and 25% by volume or less, and even more preferably 1% by volume or more and 20% by volume or less.

Unless the alignment properties of the spherical filler and the flat plate-shaped filler in the substrate layer are hindered, the filler may further contain other fillers (for example, a needle-shaped filler and the like) in addition to the spherical filler and the flat plate-shaped filler.

The total content of the spherical filler and the flat plate-shaped filler with respect to the total amount of the filler is, for example, preferably 95% by volume or more, more preferably 97% by volume or more and 100% by volume or less, and even more preferably 98% by volume or more and 100% by volume or less.

Polyimide

Examples of the polyimide include an imidized polyamic acid (polyimide precursor) which is a polymer of a tetracarboxylic dianhydride and a diamine compound. Specific examples of the polyimide include a resin obtained by polymerizing equimolar amounts of a tetracarboxylic dianhydride and a diamine compound in a solvent to obtain a polyamic acid solution and imidizing the polyamic acid.

Examples of the tetracarboxylic dianhydride include both the aromatic and aliphatic tetracarboxylic dianhydride compounds. From the viewpoint of heat resistance, for example, an aromatic tetracarboxylic dianhydride compound is preferable.

Examples of the aromatic tetracarboxylic dianhydride include pyromellitic dianhydride, 3,3',4,4'-benzophenone tetracarboxylic dianhydride, 3,3',4,4'-biphenylsulfonetetracarboxylic dianhydride, 1,4,5,8-naphthalenetetracarboxylic dianhydride, 2,3,6,7-naphthalenetetracarboxylic dianhydride, 3,3',4,4'-biphenylethertetracarboxylic dianhydride, 3,3',4,4'-dimethyldiphenylsilanetetracarboxylic dianhydride, 3,3',4,4'-tetraphenylsilanetetracarboxylic dianhydride, 1,2,3,4-furanetetracarboxylic dianhydride, 4,4'-bis(3,4-dicarboxyphenoxy)diphenylsulfide dianhydride, 4,4'-bis(3,4-dicarboxyphenoxy)diphenylsulfone dianhydride, 4,4'-bis(3,4-dicarboxyphenoxy)diphenylpropane dianhydride, 3,3',4,4'-perfluoroisopropyridene diphthalic dianhydride, 3,3',4,4'-biphenyltetracarboxylic dianhydride, 2,3,3',4'-biphenyltetracarboxylic dianhydride, bis(phthalic) phenylphosphine oxide dianhydride, p-phenylene-bis (triphenylphthalic)dianhydride, m-phenylene-bis (triphenylphthalic)dianhydride, bis(triphenylphthalic)-4,4'-diphenyl ether dianhydride, bis(triphenylphthalic)-4,4'-diphenylmethane dianhydride, and the like.

Examples of the aliphatic tetracarboxylic dianhydride include an aliphatic or alicyclic tetracarboxylic dianhydride such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxyorbornane-2-acetic dianhydride, 2,3,4,5-tetrahydrofuran tetracarboxylic dianhydride, 5-(2,5-dioxotetrahydrofuryl)-3-methyl-3-cyclohexene-1,2-dicarboxylic dianhydride, and bicyclo [2,2,2]-oct-7-ene-2,3,5,6-tetracarboxylic dianhydride; an aliphatic tetracarboxylic dianhydride having an aromatic ring such as 1,3,3a,4,5,9b-hexahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione, and the like.

Among these, as the tetracarboxylic dianhydride, for example, an aromatic tetracarboxylic dianhydride is preferable. Specifically, for example, pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, and 3,3',4,4'-benzophenonetetracarboxylic dianhydride are preferable, pyromellitic dianhydride, 3,3',4,4'-biphenyltetracarboxylic dianhydride, and 3,3',4,4'-benzophenonetetracarboxylic dianhydride are more preferable, and 3,3',4,4'-biphenyltetracarboxylic dianhydride is particularly preferable.

One tetracarboxylic dianhydride may be used alone, or two or more tetracarboxylic dianhydrides may be used in combination.

In a case where two or more tetracarboxylic dianhydrides are used in combination, either aromatic tetracarboxylic dianhydrides or aliphatic tetracarboxylic dianhydrides may be used in combination, or an aromatic tetracarboxylic dianhydride and an aliphatic tetracarboxylic dianhydride may be used in combination.

Incidentally, a diamine compound is a compound having two amino groups in the molecular structure. Examples of the diamine compound include both the aromatic and aliphatic diamine compounds. Among these, for example, an aromatic diamine compound is preferable.

Examples of diamine compounds include aromatic diamines such as p-phenylenediamine, m-phenylenediamine, 4,4'-diaminodiphenylmethane, 4,4'-diaminodiphenylethane, 4,4'-diaminodiphenyl ether, 4,4'-diaminodiphenylsulfide, 4,4'-diaminodiphenylsulfone, 1,5-diaminonaphthalene, 3,3-dimethyl-4,4'-diaminobiphenyl, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl] propane, 2,2-bis[4-(4-aminophenoxy)phenyl] hexafluoropropane, 1,4-bis(4-aminophenoxy)benzene, 4,4'-bis(4-aminophenoxy)-biphenyl, 1,3'-bis(4-aminophenoxy)benzene, 9,9-bis(4-aminophenyl)fluorene, 4,4'-(p-phenyleneisopropylidene)bisaniline, 4,4'-(m-phenyleneisopropylidene) bisaniline, 2,2'-bis[4-(4-amino-2-trifluoromethylphenoxy) phenyl] hexafluoropropane, and 4,4'-bis[4-(4-amino-2-trifluoromethyl)phenoxy]-octafluorobiphenyl; an aromatic diamine having two amino groups bonded to an aromatic ring such as diaminotetraphenyl thiophene and a hetero atom other than the nitrogen atom of the amino group; aliphatic diamines and alicyclic diamines such as 1,1-meta-xylylenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylene dimethylene diamine, tricyclo[6,2,1,02.7]-undecylenedimethyl diamine, and 4,4'-methylenebis (cyclohexylamine); and the like.

Among these, as the diamine compound, for example, an aromatic diamine compound is preferable. Specifically, for example, p-phenylenediamine, m-phenylenediamine, 4,4'-diaminodiphenylmethane, 4,4'-diaminodiphenylether, 3,4'-diaminodiphenylether, 4,4'-diaminodiphenylsulfide, and 4,4'-diaminodiphenylsulfone are preferable, and 4,4'-diaminodiphenylether and p-phenylenediamine are particularly preferable.

One diamine compound may be used alone, or two or more diamine compounds may be used in combination.

In a case where two or more diamine compounds are used in combination, either aromatic diamine compounds or aliphatic diamine compounds may be used in combination, or an aromatic diamine compound and an aliphatic diamine compound may be combined.

Among these, from the viewpoint of heat resistance, as a polyimide, for example, an aromatic polyimide (specifically, an imidized polyamic acid (a polyimide precursor) which is a polymer of an aromatic tetracarboxylic dianhydride and an aromatic diamine compound) is preferable.

The aromatic polyimide is, for example, more preferably a polyimide having a structural unit represented by the following General Formula (PI1).

(PI1)

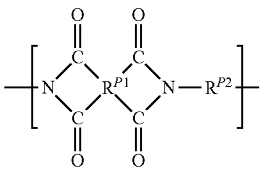

In General Formula (PI1), $R^{P1}$ represents a phenyl group or a biphenyl group, and $R^{P2}$ represents a divalent aromatic group.

Examples of the divalent aromatic group represented by $R^{P2}$ include a phenylene group, a naphthyl group, a biphenyl group, a diphenyl ether group, and the like. As the divalent aromatic group, from the viewpoint of bending durability, for example, a phenylene group or a biphenyl group is preferable.

The number-average molecular weight of the polyimide is, for example, preferably 5,000 or more and 100,000 or less, more preferably 7,000 or more and 50,000 or less, and even more preferably 10,000 or more and 30,000 or less.

The number-average molecular weight of the polyimide is measured by gel permeation chromatography (GPC) under the following measurement conditions.

Column: Tosoh TSKgel α-M (7.8 mm I.D×30 cm)

Eluent: DMF (dimethylformamide)/30 mM LiBr/60 mM phosphoric acid

Flow rate: 0.6 mL/min

Injection amount: 60 μL

Detector: RI (differential refractive index detector)

Other Additives

As necessary, the substrate layer may further contain other additives in addition to the polyimide and filler described above. Examples of those other additives include a softener (such as paraffin-based softener), a processing aid (such as stearic acid), an antioxidant (such as amine-based antioxidant), a vulcanizing agent (such as sulfur, a metal oxide, or a peroxide), and the like.

Film Thickness

From the viewpoint of thermal conductivity, mechanical strength, and the like, the film thickness of the substrate layer is, for example, preferably 30 μm or more and 200 μm or less, and particularly preferably 50 μm or more and 150 μm or less.

Formation of Substrate Layer

The substrate layer is obtained by preparing a coating liquid for forming a substrate layer containing polyimide, a filler that contains a spherical filler and a flat plate-shaped filler, and additives that are used as necessary, coating a cylindrical mold with the obtained coating liquid for forming a substrate layer, and performing drying.

For example, the substrate layer is obtained by preparing a coating liquid for forming a substrate layer containing a polyamic acid (a polyimide precursor) and additives that are used as necessary, coating a cylindrical mold with the obtained coating liquid for forming a substrate layer, and performing baking (that is, imidization).

Then, a plasma treatment is performed in advance on the surface of a cylindrical aluminum mold, and the surface properties of the cylindrical mold are transferred to the inner peripheral surface of the substrate layer such that the surface properties of the inner peripheral surface of the fixing belt are controlled. After the belt is formed, any method may be used, for example, for imparting shape on the inner surface of the belt.

Elastic Layer

The elastic layer contains an elastic material.

The elastic layer may contain known additives in addition to the elastic material.

In the elastic layer, the content of the elastic material with respect to the total mass of the substrate layer is, for example, preferably 50% by mass or more, more preferably 60% by mass or more, even more preferably 70% by mass or more, particularly preferably 80% by mass or more, and most preferably 90% by mass or more.

Examples of the elastic material include a fluororesin, a silicone resin, silicone rubber, fluororubber, fluorosilicone rubber, and the like. As the elastic material, among the above, from the viewpoint of heat resistance, thermal conductivity, insulating properties, and the like, for example, silicone rubber and fluororubber are preferable, and silicone rubber is more preferable.

Examples of the silicone rubber include RTV silicone rubber, HTV silicone rubber, liquid silicone rubber, and the like. Specific examples thereof include polydimethyl silicone rubber (MQ), methyl vinyl silicone rubber (VMQ), methyl phenyl silicone rubber (PMQ), and fluorosilicone rubber (FVMQ), and the like.

As the silicone rubber, for example, silicone rubber that is crosslinked mainly by an addition reaction is preferable. Various types of functional groups are known for silicone rubber. As the silicone rubber, for example, dimethyl silicone rubber having a methyl group, methyl phenyl silicone rubber having a methyl group and a phenyl group, vinyl silicone rubber having a vinyl group (vinyl group-containing silicone rubber), and the like are preferable.

Furthermore, as the silicone rubber, for example, vinyl silicone rubber having a vinyl group is more preferable, and silicone rubber that has an organopolysiloxane structure having a vinyl group and a hydrogen organopolysiloxane structure having a hydrogen atom bonded to a silicon atom (SiH) is even more preferable.

Examples of the fluororubber include vinylidene fluoride-based rubber, ethylene tetrafluoride/propylene-based rubber, ethylene tetrafluoride/perfluoromethylvinyl ether rubber, phosphazene-based rubber, fluoropolyether, and the like.

It is preferable that the elastic material contain, for example, silicone rubber as a main component (that is, the content of the silicone rubber is, for example, preferably 50% by mass or more with respect to the total mass of the elastic material).

The content of the silicone rubber with respect to the total mass of the elastic material used in an elastic layer is, for example, more preferably 90% by mass or more, and even more preferably 99% by mass or more. The content of the silicone rubber may be 100% by mass.

The elastic layer may contain additives such as a filler, a softener (such as a paraffin-based softener), a processing aid (such as stearic acid), an antioxidant (such as an amine-based antioxidant), and a vulcanizing agent (such as sulfur, a metal oxide, or a peroxide).

The film thickness of the elastic layer is, for example, preferably 30 μm or more and 600 μm or less, and more preferably 100 μm or more and 500 μm or less.

First, the substrate layer and the release layer are peeled from the fixing belt in the same manner as in the measurement of thermal conductivity.

The obtained elastic layer as a target is measured with RHEOVIBRON (manufactured by ORIENTEC CO., LTD.) at an amplitude of 50 μm and a frequency of 10 Hz, and a value at 150° C. is used.

The elastic layer may be formed by a known method. For example, a coating method is used.

In a case where silicone rubber is used as the elastic material of the elastic layer, for example, first, a coating liquid for forming an elastic layer is prepared which contains liquid silicone rubber that turns into silicone rubber by being cured by heating. Next, the substrate layer is coated with the coating liquid for forming an elastic layer to form a coating film, and the coating film is vulcanized as necessary, thereby forming an elastic layer on the substrate layer. During the vulcanization of the coating film, a vulcanization temperature is, for example, 150° C. or higher and 250° C. or lower, and the vulcanization time is, for example, 30 minutes or longer and 120 minutes or less.

Release Layer

The release layer is a layer that plays a role of inhibiting the molten toner image from being fixed to a surface (outer peripheral surface) coming into contact with a recording medium during fixing.

For the release layer is, for example, heat resistance or release properties are required. In this respect, for example, it is preferable to use a heat-resistant release material as the material configuring the release layer. Specific examples of such a material include fluororubber, a fluororesin, a silicone resin, polyimide, and the like.

Among these, for example, a fluororesin is preferable as the heat-resistant release material.

Specific examples of the fluororesin include a tetrafluoroethylene-perfluoroalkylvinyl ether copolymer (PFA), polytetrafluoroethylene (PTFE), a tetrafluoroethylene-hexafluoropropylene copolymer (FEP), a polyethylene-tetrafluoroethylene copolymer (ETFE), polyvinylidene fluoride (PVDF), polychlorotrifluoroethylene (PCTFE), vinyl fluoride (PVF), and the like.

A surface treatment may be performed on a surface of the release layer, the surface being on the side of the elastic layer. The surface treatment may be a wet treatment or a dry treatment, and examples thereof include a liquid ammonia treatment, an excimer laser treatment, a plasma treatment, and the like.

The thickness of the release layer is, for example, preferably 10 μm or more and 100 m or less, and more preferably 20 μm or more and 50 μm or less.

The release layer may be formed by a known method. For example, a coating method may be used.

Furthermore, a tubular release layer may be prepared in advance, and the outer periphery of the elastic layer may be covered with the tubular release layer, thereby forming the release layer. Note that an adhesive layer (for example, an adhesive layer containing a silane coupling agent having an epoxy group) may be formed on the inner surface of the tubular release layer, and then the outer periphery may be covered with the tubular release layer.

The film thickness of the fixing belt according to the present exemplary embodiment is, for example, preferably 0.06 mm or more and 0.90 mm or less, more preferably 0.15 mm or more and 0.70 mm or less, and even more preferably 0.10 mm or more and 0.60 mm or less.

Use of Fixing Belt Member

The fixing belt according to the present exemplary embodiment is used, for example, as both a heating belt and a pressure belt. The heating belt may be any of a heating belt that performs heating by an electromagnetic induction method or a heating belt that performs heating by an external heat source.

However, in a case where the fixing belt according to the present exemplary embodiment is used as a heating belt that performs heating by an electromagnetic induction method, for example, a metal layer (heating layer) that generates heat by electromagnetic induction may be provided between the substrate layer and the elastic layer.

Fixing Device

Examples of the fixing device according to the present exemplary embodiment include a fixing device including a fixing belt, a rotary member that is arranged in contact with the outer peripheral surface of the fixing belt, and a pressing member that is arranged on the inside of the fixing belt and presses the fixing belt on the rotary member from the inner peripheral surface of the fixing belt. As the fixing belt, the fixing belt according to the present exemplary embodiment is used.

Hereinafter, an example of the fixing device according to the present exemplary embodiment will be described with reference to the drawings.

Fixing Device of First Exemplary Embodiment

Figure 2:
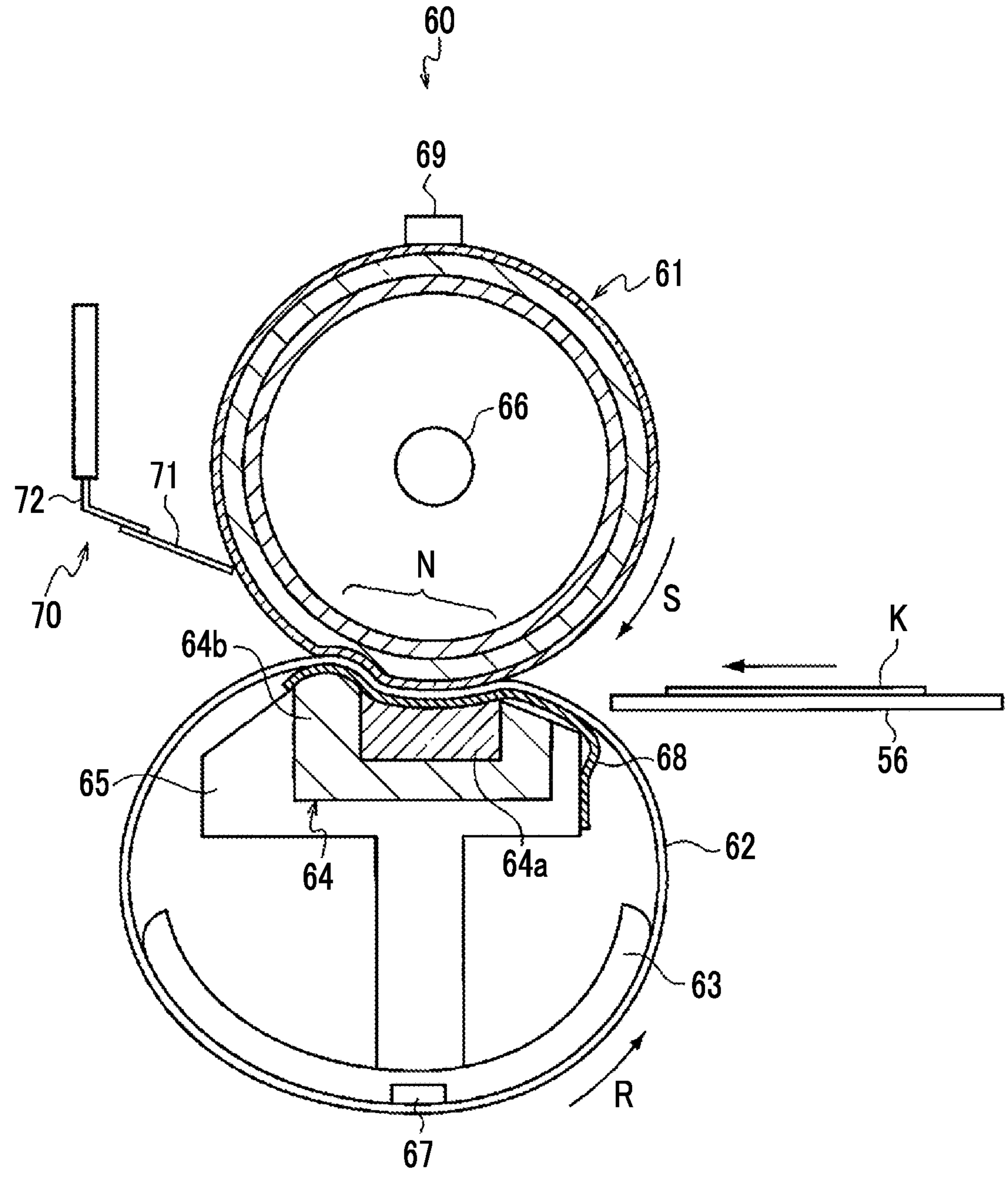
FIG. 2 is a schematic configuration view showing an example of a first exemplary embodiment of the fixing device according to the present exemplary embodiment.

The first exemplary embodiment of the fixing device will be described with reference to FIG. 2. FIG. 2 is a schematic configuration view showing an example (that is, a fixing device 60) of a first exemplary embodiment of the fixing device.

As shown in FIG. 2, a fixing device 60 is configured, for example, with a heating roll 61 (an example of a rotary member) that is driven to rotate, a pressure belt 62 (an example of a fixing belt), and a pressing pad 64 (an example of a pressing member) that presses the heating roll 61 via the pressure belt 62.

Note that the pressing pad 64 may be relatively pressed, for example, by the pressure belt 62 and the heating roll 61. Therefore, the pressure belt 62 may be pressed on the heating roll 61, or the heating roll 61 may be pressed on the pressure belt 62.

A halogen lamp 66 (an example of a heating device) is provided on the inside of the heating roll 61. The heating means is not limited to the halogen lamp, and other heating members that generate heat may be used.

Meanwhile, for example, a thermosensitive element 69 is arranged in contact with the surface of the heating roll 61. The lighting of the halogen lamp 66 is controlled based on the temperature measured by the thermosensitive element 69, and the surface temperature of the heating roll 61 is kept at a target set temperature (for example, 170° C.).

The pressure belt 62 is rotatably supported, for example, by the pressing pad 64 and a belt running guide 63 arranged on the inside of the pressure belt 62. In a nip region N (nip portion), the pressure belt 62 is arranged such that the pressure belt 62 is pressed on the heating roll 61 by the pressing pad 64.

The pressing pad 64 is arranged on the inside of the pressure belt 62 such that the pressing pad 64 is in a state of being pressed on the heating roll 61 via the pressure belt 62, and the nip region N is formed between the pressing pad 64 and the heating roll 61.

In the pressing pad 64, for example, a front nip member 64*a* for securing a wide nip region N is arranged on the entrance side of the nip region N, and a peeling nip member 64*b* for distorting the heating roll 61 is arranged on the exit side of the nip region N.

In order to reduce the sliding resistance between an inner peripheral surface of the pressure belt 62 and the pressing pad 64, for example, a sheet-like sliding member 68 is provided on a surface of the front nip member 64*a* and the peeling nip member 64*b*, the surface being in contact with the pressure belt 62. The pressing pad 64 and the sliding member 68 are held by a holding member 65 made of a metal.

For example, the holding member 65 has a configuration in which the belt running guide 63 is attached to the holding member 65, and the pressure belt 62 rotates.

The heating roll 61 rotates, for example, in the direction of an arrow S by a driving motor not shown in the drawing. Following the rotation, the pressure belt 62 rotates in the direction of an arrow R opposite to the rotation direction of the heating roll 61. That is, for example, the heating roll 61 rotates clockwise in FIG. 2, while the pressure belt 62 rotates counterclockwise.

Then, paper K (an example of a recording medium) having an unfixed toner image is guided, for example, by a fixing entrance guide 56 and transported to the nip region N. While the paper K is passing through the nip region N, the unfixed toner image on the paper K is fixed by the pressure and heat acting on the nip region N.

In the fixing device 60, for example, by the front nip member 64*a* in the form of a recess conforming to the outer peripheral surface of the heating roll 61, a wider nip region N is secured, compared to a configuration having no front nip member 64*a*.

Furthermore, the fixing device 60 is configured, for example, with the peeling nip member 64*b* that is arranged to protruding from the outer peripheral surface of the heating roll 61, such that the heating roll 61 is locally distorted much in the exit region of the nip region N.

In a case where the peeling nip member 64*b* is arranged as above, for example, the paper K after fixing passes through a portion that is locally distorted much while passing through a peeling nip region. Therefore, the paper K is easily peeled off from the heating roll 61.

As an auxiliary means for peeling, for example, a peeling member 70 is provided on a downstream side of the nip region N of the heating roll 61. The peeling member 70 is, for example, held by a holding member 72, in a state where a peeling claw 71 is close to the heating roll 61 in a direction (counter direction) opposite to the rotation direction of the heating roll 61.

Fixing Device of Second Exemplary Embodiment

Figure 3:
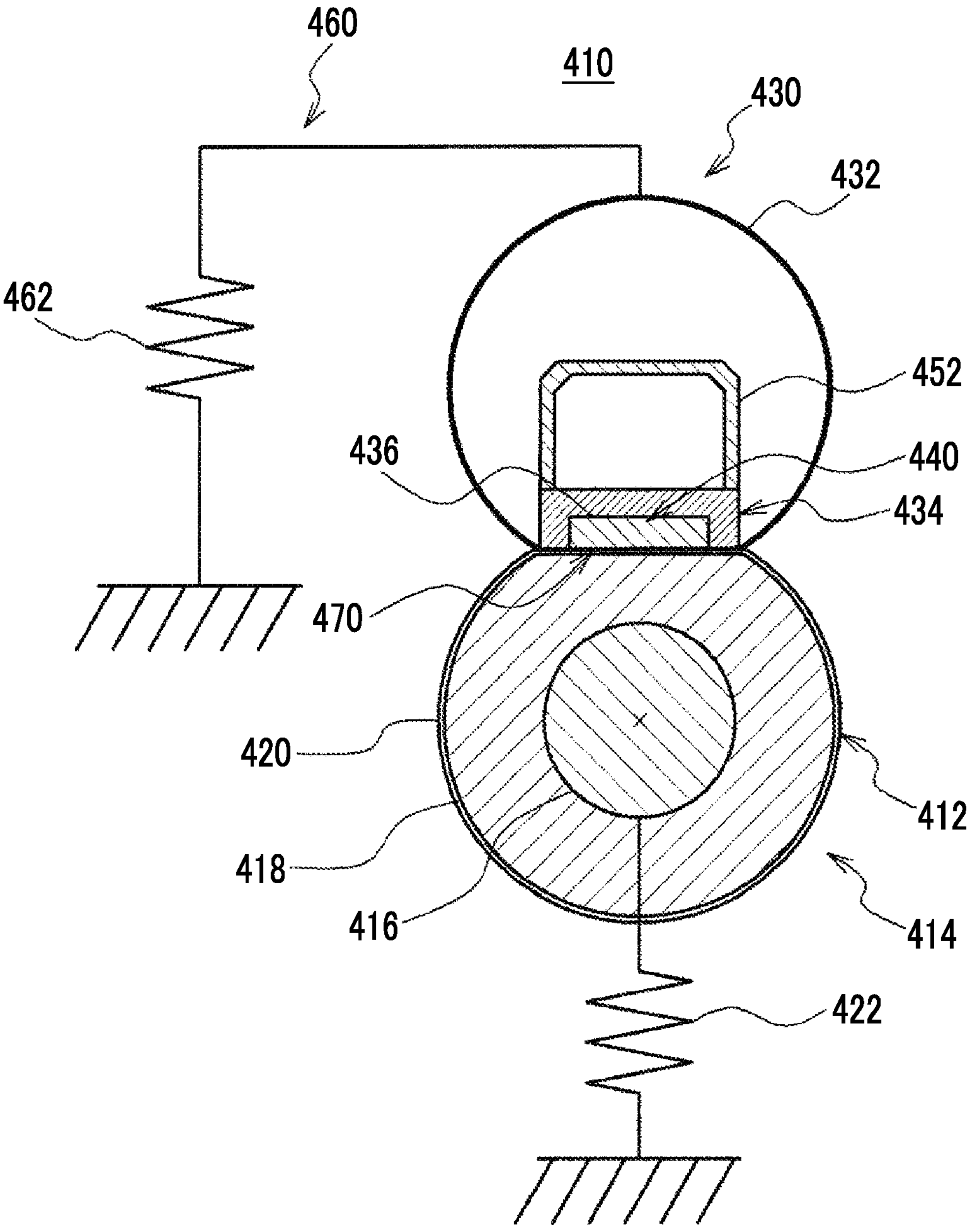
FIG. 3 is a schematic configuration view showing an example of a second exemplary embodiment of the fixing device according to the present exemplary embodiment.

A second exemplary embodiment of the fixing device will be described with reference to FIG. 3. FIG. 3 is a schematic configuration view showing an example (that is, a fixing device 410) of the second exemplary embodiment of the fixing device.

As shown in FIG. 3, the fixing device 410 has a pressure portion 414 and a heating portion 430 facing the pressure portion 414.

The pressure portion 414 has a cylindrical roll member 412 (an example of a rotary member), is provided to face the heating portion 430, and rotates by a driving device not shown in the drawing in a state of being pressed on the outer surface of a heating belt 432 of the heating portion 430.

In the pressure portion 414, the roll member 412 is a so-called soft roll having a shaft portion 416 that consists, for example, of a metal material such as iron, stainless steel, or aluminum, an elastic layer 418 that covers the shaft portion 416, and a release layer 420 that coats or is applied to the elastic layer 418. The release layer 420 is formed of an insulating material having excellent release properties, such as PFA.

In the pressure portion 414, the roll member 412 is grounded. The pressure portion 414 is grounded from the shaft portion 416 of the roll member 412 with the pressure portion-side resistor 422 interposed therebetween. In this way, grounding the pressure portion 414 with the pressure portion-side resistor 422 interposed therebetween makes it possible to suppress the leakage of current (leakage current) from the electrode of a planar heating element 440 of the heating portion 430.

In the pressure portion 414, the roll member 412 is pressed on the heating portion 430 by a pressing member not shown in the drawing made of an elastic substance such as a coil spring. For example, one end of the pressing member is mounted on the shaft portion 416, and the other end is mounted on the body of an image forming apparatus.

The heating portion 430 has the heating belt 432 (an example of a fixing belt) and has, on the inside of the heating belt 432, the planar heating element 440 that is a heating member heating the heating belt 432 from the inner peripheral surface side, a holding member 434 that holds the planar heating element 440, and a frame member 452 that supports the holding member 434. The holding member 434 is supported by the frame member 452, and has a structure that can withstand the pressure from the pressure portion 414.

A unit consisting of the planar heating element 440, the holding member 434, and the frame member 452 corresponds to an example of a pressing member.

In the heating portion 430, for example, a circular support member not shown in the drawing that supports the heating belt 432 is provided on both ends of the heating belt 432 in the longitudinal direction. The support member is provided with a heating member gear not shown in the drawing that rotates the heating belt 432. One side of the heating member gear is connected to a driving device not shown in the drawing, such as a motor in an image forming apparatus body 12. The heating belt 432 is rotated.

In the heating portion 430, the planar heating element 440 as a heating member is, for example, in the form of a long plate-shaped element extending in the longitudinal direction of the heating portion 430. The planar heating element 440 has an electrically insulating substrate, an insulating layer formed of a polyimide-based heat-resistant resin, a pair of electrodes for power supply, and a resistive heating portion made, for example, of stainless steel that generates heat by being supplied with power from the electrodes. The electrodes and the resistive heating portion are connected by a power supply portion. The electrodes, the power supply portion, and the resistive heating portion are embedded in an insulating layer. The electrodes of the planar heating element 440 are grounded with the heating portion-side resistor 462 interposed therebetween.

In the heating portion 430, the holding member 434 is formed, for example, of a resin material such as liquid crystal polymer (LCP) having high heat resistance. On a side of the heating portion 430 facing the pressure portion 414, a groove portion 436 for holding the planar heating element 440 is formed along the longitudinal direction.

The holding member 434 is configured to form a pressing region 470 in a case where the holding member 434 is pressed on the pressure portion 414 in a state where the planar heating element 440 is held in the groove portion 436.

In the heating portion 430, the frame member 452 is formed, for example, of a metal material. The frame member 452 is configured to support the holding member 434, be fixed to a support member not shown in the drawing through both ends of the frame member 452, and enable the holding member 434 to withstand the pressure from the pressure portion 414. The heating portion 430 may be provided with a thermistor or the like for temperature detection.

In the fixing device 410 described above, in a state where the heating belt 432 is sandwiched between the roll member 412 of the pressure portion 414 and the unit consisting of the planar heating element 440, the holding member 434, and the frame member 452 of the heating portion 430, the pressing region 470 is formed, and a recording medium holding an unfixed toner image is passed through the pressing region 470 such that the unfixed toner image is fixed by the application of heat and pressure.

Image Forming Apparatus

Next, the image forming apparatus according to the present exemplary embodiment will be described.

An image forming apparatus according to the present exemplary embodiment includes an image holder, a charging device that charges a surface of the image holder, a latent image forming device that forms a latent image on the charged surface of the image holder, a developing device that develops the latent image with a toner to form a toner image, a transfer device that transfers the toner image to a recording medium, and a fixing device that fixes the toner image to the recording medium.

As the fixing device, the fixing device according to the present exemplary embodiment is used.

In the image forming apparatus according to the present exemplary embodiment, the fixing device may be made into a cartridge such that the fixing device is detachable from an image forming apparatus. That is, the image forming apparatus according to the present exemplary embodiment may include the fixing device according to the present exemplary embodiment, as a device configuring a process cartridge.

Hereinafter, the image forming apparatus according to the present exemplary embodiment will be described with reference to a drawing.

Figure 4:
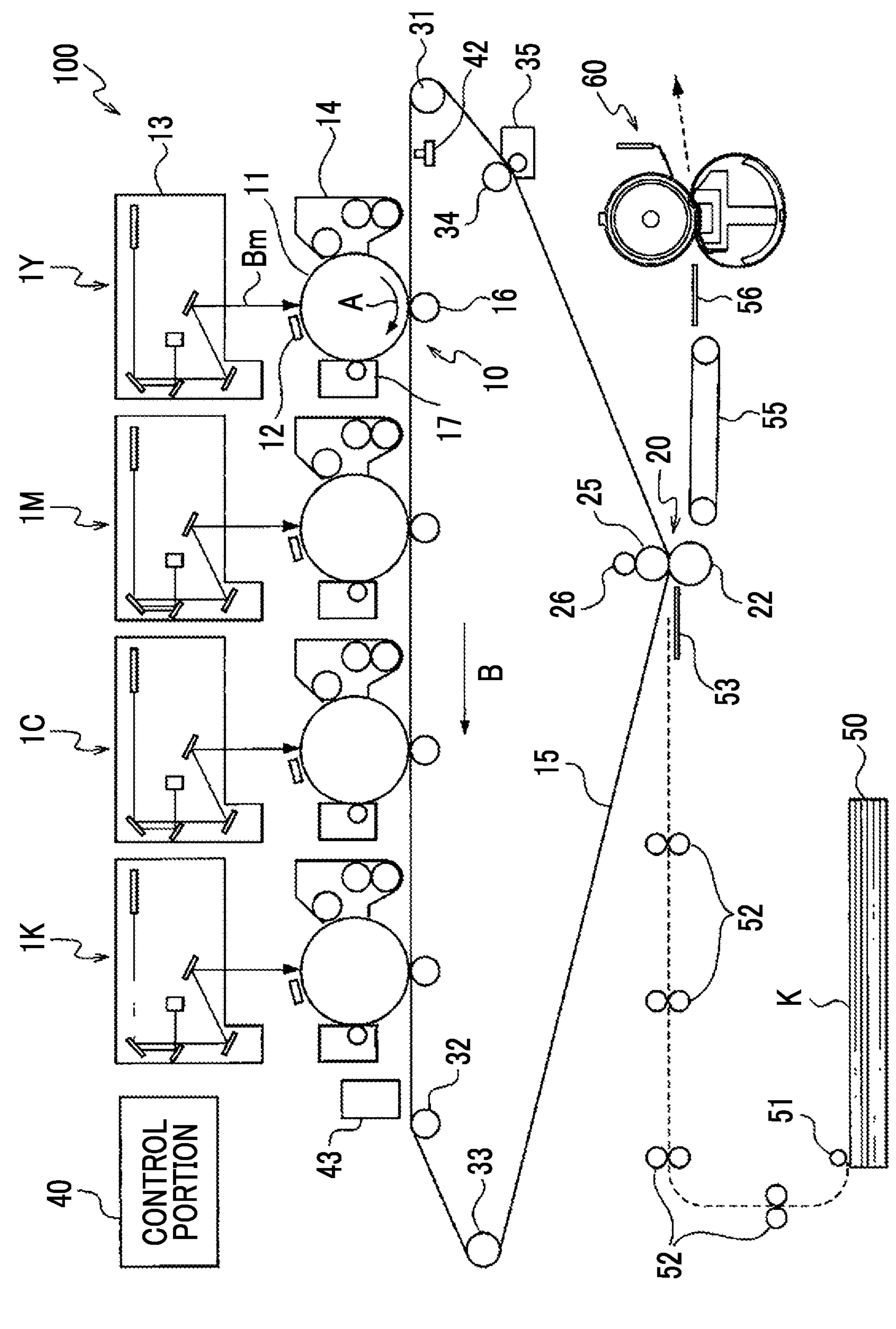
FIG. 4 is a schematic configuration view showing an example of an image forming apparatus according to the present exemplary embodiment.

FIG. 4 is a schematic configuration view showing an example of the image forming apparatus according to the present exemplary embodiment.

As shown in FIG. 4, an image forming apparatus 100 according to the present exemplary embodiment is, for example, an intermediate transfer-type image forming apparatus that is generally called a tandem type, and includes a plurality of image forming units 1Y, 1M, 1C, and 1K in which a toner image of each color component is formed by an electrophotographic method, a primary transfer portion 10 that performs sequential transfer (primary transfer) of the toner image of each color component formed by each of the image forming units 1Y, 1M, 1C, and 1K to an intermediate transfer belt 15, a secondary transfer portion 20 that performs batch transfer (secondary transfer) of the overlapped toner images transferred to the intermediate transfer belt 15 to paper K as a recording medium, and a fixing device 60 that fixes the images transferred by the secondary transfer on the paper K. The image forming apparatus 100 also has a control portion 40 that controls the operation of each device (each portion).

The fixing device 60 is the first exemplary embodiment of the fixing device described above. The image forming apparatus 100 may be configured to include the second exemplary embodiment of the fixing device described above.

Each of the image forming units 1Y, 1M, 1C, and 1K of the image forming apparatus 100 includes a photoreceptor 11 that rotates in the direction of an arrow A, as an example of an image holder that holds a toner image formed on the surface.

As an example of a charging means, a charger 12 for charging the photoreceptor 11 is provided around the photoreceptor 11. As an example of a latent image forming means, a laser exposure machine 13 that draws an electrostatic latent image on the photoreceptor 11 is provided (in FIG. 4, an exposure beam is represented by a mark Bm).

Around the photoreceptor 11, as an example of a developing means, there are provided a developing machine 14 that contains toners of each color component and makes the electrostatic latent image on the photoreceptor 11 into a visible image by using the toners and a primary transfer roll 16 that transfers toner images of each color component formed on the photoreceptor 11 to the intermediate transfer belt 15 by the primary transfer portion 10.

Around the photoreceptor 11, there are provided a photoreceptor cleaner 17 that removes the residual toner on the photoreceptor 11 and devices for electrophotography, such as the charger 12, the laser exposure machine 13, the developing machine 14, the primary transfer roll 16, and the photoreceptor cleaner 17, that are arranged in sequence along the rotation direction of the photoreceptor 11. These image forming units 1Y, 1M, 1C, and 1K are substantially linearly arranged in order of yellow (Y), magenta (M), cyan (C), and black (K) from the upstream side of the intermediate transfer belt 15.

The intermediate transfer belt 15 which is an intermediate transfer member is configured with a film-shaped pressure belt including a base layer that is a resin such as polyimide or polyamide and containing an appropriate amount of an antistatic agent such as carbon black. Furthermore, the intermediate transfer belt 15 is configured to have a volume resistivity of $10^6$ Ωcm or more and $10^{14}$ Ωcm or less and has a thickness of about, for example, 0.1 mm.

By various rolls, the intermediate transfer belt 15 is driven to circulate (rotate) in a direction B shown in FIG. 4 at a speed fit for the purpose. The image forming apparatus 100 has, as the various rolls, a driving roll 31 that is driven by a motor (not shown in the drawing) excellent in maintaining a constant speed and rotates the intermediate transfer belt 15, a support roll 32 that supports the intermediate transfer belt 15 substantially linearly extending along the arrangement direction of the photoreceptors 11, a tension applying roll 33 that applies tension to the intermediate transfer belt 15 and functions as a correcting roll preventing meandering of the intermediate transfer belt 15, a back roll 25 that is provided in the secondary transfer portion 20, and a back roll 34 for cleaning that is provided in a cleaning portion scrapping off the residual toner on the intermediate transfer belt 15.

The primary transfer portion 10 is configured with the primary transfer roll 16 that is arranged to face the photoreceptor 11 across the intermediate transfer belt 15. The primary transfer roll 16 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting material such as carbon black and has a volume resistivity of $10^{7.5}$ Ωcm or more and $10^{8.5}$ Ωcm or less.

The primary transfer roll 16 is arranged to be pressed on the photoreceptor 11 across the intermediate transfer belt 15, and the polarity of voltage (primary transfer bias) applied to the primary transfer roll 16 is opposite to the charging polarity (negative polarity, the same shall apply hereinafter) of the toner. As a result, the toner image on each photoreceptor 11 is sequentially electrostatically sucked onto the intermediate transfer belt 15, which leads to the formation of overlapped toner images on the intermediate transfer belt 15.

The secondary transfer portion 20 includes the back roll 25 and a secondary transfer roll 22 that is arranged on a toner image-holding surface side of the intermediate transfer belt 15.

The surface of the back roll 25 is configured with a tube of blended rubber of EPDM and NBR in which carbon is dispersed, and the inside of the back roll 25 is configured with EPDM rubber. Furthermore, the back roll 25 is formed such that the surface resistivity thereof is $10^7$ Ω/□ or more and $10^{10}$ Ω/□ or less. The hardness of the back roll 25 is set to, for example, 70° (ASKER C: manufactured by KOBUNSHI KEIKI CO., LTD., the same shall apply hereinafter). The back roll 25 is arranged on the back surface side of the intermediate transfer belt 15 to configure a counter electrode of the secondary transfer roll 22. A power supply roll 26 made of a metal to which secondary transfer bias is stably applied is arranged to come into contact with the back roll 25.

The secondary transfer roll 22 is configured with a core and a sponge layer as an elastic layer fixed around the core. The core is a cylindrical rod configured with a metal such as iron or SUS. The sponge layer is a sponge-like cylindrical roll which is formed of blended rubber of NBR, SBR, and EPDM mixed with a conducting material such as carbon black and has a volume resistivity of $10^{7.5}$ Ωcm or more and $10^{8.5}$ Ωcm or less.

The secondary transfer roll 22 is arranged to be pressed on the back roll 25 across the intermediate transfer belt 15. The secondary transfer roll 22 is grounded such that the secondary transfer bias is formed between the secondary transfer roll 22 and the back roll 25, which induces secondary transfer of the toner image onto the paper K transported to the secondary transfer portion 20.

On the downstream side of the secondary transfer portion 20 of the intermediate transfer belt 15, an intermediate transfer belt cleaner 35 separable from the intermediate transfer belt 15 is provided which removes the residual toner or paper powder on the intermediate transfer belt 15 remaining after the secondary transfer and cleans the surface of the intermediate transfer belt 15.

The intermediate transfer belt 15, the primary transfer portion 10 (primary transfer roll 16), and the secondary transfer portion 20 (secondary transfer roll 22) correspond to an example of a transfer means.

On the other hand, on the upstream side of the yellow image forming unit 1Y, a reference sensor (home position sensor) 42 is arranged which generates a reference signal to be a reference for taking the image forming timing in each of the image forming units 1Y, 1M, 1C, and 1K. The reference sensor 42 recognizes a mark provided on the back side of the intermediate transfer belt 15 and generates a reference signal. Each of the image forming units 1Y, 1M, 1C, and 1K is configured such that these units start to form images according to the instruction from the control portion 40 based on the recognition of the reference signal. On the downstream side of the black image forming unit 1K, an image density sensor 43 for adjusting image quality is arranged.

The image forming apparatus according to the present exemplary embodiment includes, as a transport means for transporting the paper K, a paper storage portion 50 that stores the paper K, a paper feeding roll 51 that takes out and transports the paper K stacked in the paper storage portion 50 at a predetermined timing, a transport roll 52 that transports the paper K transported by the paper feeding roll 51, a transport guide 53 that sends the paper K transported by the transport roll 52 to the secondary transfer portion 20, a transport belt 55 that transports the paper K transported after going through secondary transfer by the secondary transfer roll 22 to the fixing device 60, and a fixing entrance guide 56 that guides the paper K to the fixing device 60.

Next, the basic image forming process of the image forming apparatus according to the present exemplary embodiment will be described.

In the image forming apparatus according to the present exemplary embodiment, image data output from an image reading device not shown in the drawing, a personal computer (PC) not shown in the drawing, or the like is subjected to image processing by an image processing device not shown in the drawing, and then the image forming units 1Y, 1M, 1C, and 1K perform the image forming operation.

In the image processing device, image processing, such as shading correction, misregistration correction, brightness/color space conversion, gamma correction, or various image editing works such as frame erasing or color editing and movement editing, is performed on the input image data. The image data that has undergone the image processing is converted into color material gradation data of 4 colors, Y, M, C, and K, and is output to the laser exposure machine 13.

In the laser exposure machine 13, according to the input color material gradation data, for example, the photoreceptor 11 of each of the image forming units 1Y, 1M, 1C, and 1K is irradiated with the exposure beam Bm emitted from a semiconductor laser. The surface of each of the photoreceptors 11 of the image forming units 1Y, 1M, 1C, and 1K is charged by the charger 12 and then scanned and exposed by the laser exposure machine 13. In this way, an electrostatic latent image is formed. By each of the image forming units 1Y, 1M, 1C, and 1K, the formed electrostatic latent image is developed as a toner image of each of the colors Y, M, C, and K.

In the primary transfer portion 10 where each photoreceptor 11 and the intermediate transfer belt 15 come into contact with each other, the toner images formed on the photoreceptors 11 of the image forming units 1Y, 1M, 1C, and 1K are transferred onto the intermediate transfer belt 15. More specifically, in the primary transfer portion 10, by the primary transfer roll 16, a voltage (primary transfer bias) with a polarity opposite to the charging polarity (negative polarity) of the toner is applied to the substrate of the intermediate transfer belt 15, and the toner images are sequentially overlapped on the surface of the intermediate transfer belt 15 and subjected to primary transfer.

After the primary transfer by which the toner images are sequentially transferred to the surface of the intermediate transfer belt 15, the intermediate transfer belt 15 moves, and the toner images are transported to the secondary transfer portion 20. In a case where the toner images are transported to the secondary transfer portion 20, in the transport means, the paper feeding roll 51 rotates in accordance with the timing at which the toner images are transported to the secondary transfer portion 20, and the paper K having the target size is fed from the paper storage portion 50. The paper K fed from the paper feeding roll 51 is transported by the transport roll 52, passes through the transport guide 53, and reaches the secondary transfer portion 20. Before reaching the secondary transfer portion 20, the paper K is temporarily stopped, and a positioning roll (not shown in the drawing) rotates according to the movement timing of the intermediate transfer belt 15 holding the toner images, so that the position of the paper K is aligned with the position of the toner images.

In the secondary transfer portion 20, via the intermediate transfer belt 15, the secondary transfer roll 22 is pressed on the back roll 25. At this time, the paper K transported at the right timing is interposed between the intermediate transfer belt 15 and the secondary transfer roll 22. At this time, in a case where a voltage (secondary transfer bias) with the same polarity as the charging polarity (negative polarity) of the toner is applied from the power supply roll 26, a transfer electric field is formed between the secondary transfer roll 22 and the back roll 25. In the secondary transfer portion 20 pressed by the secondary transfer roll 22 and the back roll 25, the unfixed toner images held on the intermediate transfer belt 15 are electrostatically transferred onto the paper K in a batch.

Thereafter, the paper K to which the toner images are electrostatically transferred is transported in a state of being peeled off from the intermediate transfer belt 15 by the secondary transfer roll 22, and is transported to the transport belt 55 provided on the downstream side of the secondary transfer roll 22 in the paper transport direction. The transport belt 55 transports the paper K to the fixing device 60 according to the optimum transport speed in the fixing device 60. The unfixed toner images on the paper K transported to the fixing device 60 are fixed on the paper K by being subjected to a fixing treatment by heat and pressure by the fixing device 60. Then, the paper K on which a fixed image is formed is transported to an ejected paper-storing portion (not shown in the drawing) provided in an ejection portion of the image forming apparatus.

Meanwhile, after the transfer to the paper K is finished, the residual toner remaining on the intermediate transfer belt 15 is transported to the cleaning portion as the intermediate transfer belt 15 rotates, and is removed from the intermediate transfer belt 15 by the back roll 34 for cleaning and an intermediate transfer belt cleaner 35.

Hitherto, the present exemplary embodiment has been described. However, the present exemplary embodiment is not limited to the above exemplary embodiments, and various modifications, changes, and ameliorations can be added thereto.

EXAMPLES

Hereinafter, the present invention will be more specifically described with reference to examples. However, the present invention is not limited to the following examples.

Example 1

Flat plate-shaped fillers and spherical fillers of the types and amounts shown in Table 1 are mixed with a commercially available polyimide precursor solution (manufactured by UNITIKA LTD.: U-IMIDE varnish KX-R, solid content ratio: 18%) and dispersed using a high-pressure homogenizer, thereby obtaining a coating liquid for forming a substrate layer.

The surface of a cylindrical mold made of stainless steel having an outer diameter of 168 mm is coated with the coating liquid for forming a substrate layer, and then the coating film is dried at 140° C. for 20 minutes. Next, the cylindrical mold is placed in a heating and baking furnace and heated at 320° C. for 25 minutes. After cooling, the coating film is removed from the cylindrical substrate, thereby obtaining a fixing belt consisting of a substrate layer having a thickness of 0.08 mm.

Examples 1 to 7 and Comparative Examples 1 to 5

Fixing belts of each example are obtained according to the same specifications as in Example 1, except that the amount of polyimide and the types and amounts of the flat plate-shaped filler and the spherical filler are set according to the specifications shown in Table 1.

Details of each material in the table are as follows.

Plate-Shaped Filler

- Graphen nanoplatelet: GNZ-XC, manufactured by Graphene Platform Corporation
- Boron nitride: manufactured by Sigma-Aldrich Corporation
- Graphite: UP-15N, manufactured by Nippon Graphite Group Needle-Shaped Filler

- Carbon nanotubes: VGCF-H, manufactured by Showa Denko K. K.

Spherical Filler

- Acetylene black: DENKA BLACK, manufactured by Denka Company Limited.
- Graphitized carbon black: TOKABLACK, manufactured by Tokai Carbon Co., Ltd.
- Non-graphitized carbon black: Special Black 4, manufactured by Orion Engineered Carbons S.A.

Evaluation of Thermal Conductivity

For the fixing belt of each example, the thermal conductivity is measured under the condition of a load of 50 g by a temperature wave analysis method using ai-phase (manufactured by Ai-Phase Co., Ltd.). Based on the following standard, the thermal conductivity is evaluated. Note that A and B are acceptable level. The results are shown in Table 1.

Evaluation Standard

- A: The thermal conductivity is 1.2 (W/m K) or more, which tells that the thermal conductivity is excellent.
- B: The thermal conductivity is 0.9 (W/m K) or more and less than 1.2 (W/m K), which tells that the thermal conductivity is in an acceptable range.
- C: The thermal conductivity is less than 0.9 (W/m K), which tells that the thermal conductivity is low.

Evaluation of Sliding Properties

The obtained fixing belt of each example is mounted as the heating belt 432 on the fixing device shown in FIG. 3. The fixing device is mounted on an image forming apparatus ("ApeosPort C5570" manufactured by FUJIFILM Business Innovation Corp.).

The fixing belt of each example is installed on a friction player (manufactured by RHESCA CO., LTD., trade name: Friction Player FPR-2000), a load of 1 kgf is applied thereto from above with a stainless steel pin, and a coefficient of dynamic friction is measured on a 45° arc under the conditions of 1,200 kcycle, a pressure of 0.05 $N/mm^2$, and a speed of 0.6 m/s. From the coefficient of dynamic friction of the first sliding cycle and the coefficient of dynamic friction of the after 1,200 kcycles, the rate of increase of coefficient of dynamic friction (=coefficient of dynamic friction after 1,200 kcycles−coefficient of dynamic friction of first cycle)/coefficient of dynamic friction after 1,200 kcycles×100) is calculated, and evaluated according to the following standard. Note that A and B are acceptable level. The results are shown in Table 1.

Evaluation Standard

A: The rate of increase of the coefficient of dynamic friction is less than 1%, which tells that the sliding properties are excellent.

B: The rate of increase of the coefficient of dynamic friction is 1% or more and less than 20%, which tells that the sliding properties are in an acceptable range.

C: The rate of increase of the coefficient of dynamic friction is 20% or more, which tells that the sliding properties are poor.

Folding Resistance Test (Bending Resistance)

Based on JIS-P8115 (MIT tester, sample width of 15 mm, the number of times of bending that the fixing belt endures under a tensile load of 1 kg before the fixing belt is broken), the number of times of repeated bending that the fixing belt endures is measured as a bending resistance test.

The fixing belt of each example is cut into a strip-shaped sample having a width of 15 mm and a length of 200 mm in the circumferential direction, both ends thereof are fixed, a tensile force of 1 kgf is applied thereto, and the fixing belt is repeatedly bent (fold) 90° to the left and right by using a terminal with curvature shape R3 as a pivot. At this time, the number of times of bending that the sample endures before broken is used as the number of times of repeated bending that the sample endures to evaluate bending resistance. The test is conducted in an environment of normal temperature and humidity (temperature 22° C., humidity 45 RH %). Here, the bending resistance is evaluated based on the following standard. Note that A and B are acceptable level. The results are shown in Table 1.

Evaluation Standard

A: The number of times of bending that the sample endures is more than 5,000.

B: The number of times of bending that the sample endures is more than 1,000 and 5,000 or less.

C: The number of times of bending that the sample endures is 1,000 or less.

In the table, "−" listed in an item of each filler means that the filler in each item is not used.

In the table, "[% by volume]" listed in an item of each material refers to the ratio (% by volume) of the material of each item to the entire substrate layer.

In the table, the item "Polyimide [% by volume]" refers to the content of polyimide in the substrate layer. In the table, the item "To substrate layer [% by volume]" for the flat plate-shaped filler refers to the content of the flat plate-shaped filler with respect to the substrate layer, and the item "To spherical [% by volume]" refers to the content of the flat plate-shaped filler with respect to the spherical filler.

In the table, the item "Filler ratio (flat plate/spherical)" refers to the volume ratio of the flat plate-shaped filler to the spherical filler (flat plate-shaped filler/spherical filler).

TABLE 1

| | Polyimide [% by volume] | Flat plate-shaped filler: Filler name | Flat plate-shaped filler: To substrate layer [% by volume] | Flat plate-shaped filler: To spherical [% by volume] | Flat plate-shaped filler: Aspect ratio | Flat plate-shaped filler: Average primary particle size [nm] | Spherical filler: Filler name | Spherical filler: [% by volume] | Spherical filler: Average particle size [nm] | Fille ratio [flat plate/spherical] | Total amount of filler [% by volume] | Evaluation of thermal conductivity | Sliding test | Folding resistance test |
|---|---|---|---|---|---|---|---|---|---|---|---|---|---|---|
| Example 1 | 65 | Graphene nanoplatelets | 7 | 20 | 1660 | 500 | Acetylene black | 28 | 35 | 0.25 | 35 | A | A | A |
| Example 2 | 65 | Graphene nanoplatelets | 7 | 20 | 1660 | 500 | Graphitized carbon black | 28 | 25 | 0.25 | 35 | A | A | A |
| Example 3 | 65 | Graphene nanoplatelets | 21 | 60 | 1660 | 500 | Acetylene black | 14 | 35 | 1.50 | 35 | A | A | B |
| Example 4 | 65 | Boron nitride | 7 | 20 | 1000 | 1000 | Acetylene black | 28 | 35 | 0.25 | 35 | B | A | A |
| Example 5 | 65 | Graphite | 7 | 20 | 5000 | 5000 | Acetylene black | 28 | 35 | 0.25 | 35 | A | B | B |
| Example 6 | 65 | Graphene nanoplatelets | 7 | 20 | 1660 | 500 | Carbon black | 28 | 25 | 0.25 | 35 | B | B | B |
| Example 7 | 80 | Graphene nanoplatelets | 10 | 50 | 1660 | 500 | Acetylene black | 10 | 35 | 1.00 | 20 | B | A | B |
| Comparative Example 1 | 60 | — | 0 | 0 | — | — | Acetylene black | 40 | 35 | 0.00 | 40 | A | C | C |
| Comparative Example 2 | 60 | Graphene nanoplatelets | 40 | 100 | 1660 | 500 | — | 0 | — | — | 40 | C | B | C |
| Comparative Example 3 | 60 | Graphene nanoplatelets | 8 | 20 | 1660 | 500 | Acetylene black | 32 | 35 | 0.25 | 40 | A | C | C |
| Comparative Example 4 | 80 | Carbon nanotubes | 20 | 100 | 400 | 6000 | — | 0 | — | — | 20 | B | C | B |
| Comparative Example 5 | 65 | — | 0 | 0 | — | — | Acetylene black | 35 | 35 | 0.00 | 35 | C | B | A |

From the above results, it has been found that the fixing belts of the present examples outperform the fixing belts of comparative examples, in terms of both the thermal conductivity and sliding properties. Furthermore, from the results of the folding resistance test, it has been found that the fixing belts of the present examples are also excellent in bending resistance.

(((1))) A fixing belt comprising:

a substrate layer having polyimide; and a filler containing a spherical filler and a cleavable flat plate-shaped filler, wherein a total amount of the filler is less than 40% by volume with respect to the substrate layer.

(((2))) The fixing belt according to (((1))), wherein a content of the flat plate-shaped filler is 20% by mass or more and 60% by mass or less with respect to the total amount of the filler containing the spherical filler and the flat plate-shaped filler.

(((3))) The fixing belt according to (((1))) or (((2))), wherein a volume ratio of the flat plate-shaped filler to the spherical filler (flat plate-shaped filler/spherical filler) is 0.10 or more and 3.00 or less.

(((4))) The fixing belt according to any one of (((1))) to (((3))), wherein the spherical filler contains at least one of acetylene black or graphitized carbon black.

(((5))) The fixing belt according to any one of (((1))) to (((4))), wherein the flat plate-shaped filler contains at least one material selected from the group consisting of graphene nanoplatelets, graphite, and hexagonal boron nitride.

(((6))) The fixing belt according to any one of (((1))) to (((5))), wherein the spherical filler has an average particle size of 25 nm or more.

(((7))) The fixing belt according to (((6))), wherein the spherical filler has an average particle size of 25 nm or more and 200 nm or less.

(((8))) The fixing belt according to any one of (((1))) to (((7))), wherein the flat plate-shaped filler has an average primary particle size of 10,000 nm or less.

(((9))) The fixing belt according to (((8))), wherein in the flat plate-shaped filler, an aspect ratio between a thickness direction and a flat plate direction is 1,000 or more and 5,000 or less.

(((10))) A fixing device comprising:

the fixing belt according to any one of (((1))) to (((9)));

a rotary member that is arranged in contact with an outer peripheral surface of the fixing belt; and a pressing member that is arranged on inside of the fixing belt and presses the fixing belt on the rotary member from an inner peripheral surface of the fixing belt.

(((11))) An image forming apparatus comprising:

an image holder;

a charging device that charges a surface of the image holder;

a latent image forming device that forms a latent image on the charged surface of the image holder;

a developing device that develops the latent image with a toner to form a toner image;

a transfer device that transfers the toner image to a recording medium; and the fixing device according to (((10))) that fixes the toner image to the recording medium.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A fixing belt comprising:

a substrate layer that has polyimide; and a filler containing a spherical filler and a cleavable flat plate-shaped filler, wherein a total amount of the filler is 1% by volume or more and less than 40% by volume with respect to the substrate layer.

2. The fixing belt according to claim 1, wherein a content of the flat plate-shaped filler is 20% by mass or more and 60% by mass or less with respect to the total amount of the filler containing the spherical filler and the flat plate-shaped filler.

3. The fixing belt according to claim 1, wherein a volume ratio of the flat plate-shaped filler to the spherical filler (flat plate-shaped filler/spherical filler) is 0.10 or more and 3.00 or less.

4. The fixing belt according to claim 1, wherein the spherical filler contains at least one of acetylene black or graphitized carbon black.

5. The fixing belt according to claim 1, wherein the flat plate-shaped filler contains at least one material selected from the group consisting of graphene nanoplatelets, graphite, and hexagonal boron nitride.

6. The fixing belt according to claim 1, wherein the spherical filler has an average particle size of 25 nm or more.

7. The fixing belt according to claim 6, wherein the spherical filler has an average particle size of 25 nm or more and 200 nm or less.

8. The fixing belt according to claim 1, wherein the flat plate-shaped filler has an average primary particle size of 10,000 nm or less.

9. The fixing belt according to claim 8, wherein in the flat plate-shaped filler, an aspect ratio between a thickness direction and a flat plate direction is 1,000 or more and 5,000 or less.

10. A fixing device comprising:

the fixing belt according to claim 1;

a rotary member that is arranged in contact with an outer peripheral surface of the fixing belt; and a pressing member that is arranged on inside of the fixing belt and presses the fixing belt on the rotary member from an inner peripheral surface of the fixing belt.

11. A fixing device comprising:

the fixing belt according to claim 2;

a rotary member that is arranged in contact with an outer peripheral surface of the fixing belt; and a pressing member that is arranged on inside of the fixing belt and presses the fixing belt on the rotary member from an inner peripheral surface of the fixing belt.

12. A fixing device comprising:

the fixing belt according to claim 3;

a rotary member that is arranged in contact with an outer peripheral surface of the fixing belt; and a pressing member that is arranged on inside of the fixing belt and presses the fixing belt on the rotary member from an inner peripheral surface of the fixing belt.

13. A fixing device comprising:

the fixing belt according to claim 4;

a rotary member that is arranged in contact with an outer peripheral surface of the fixing belt; and a pressing member that is arranged on inside of the fixing belt and presses the fixing belt on the rotary member from an inner peripheral surface of the fixing belt.

14. A fixing device comprising:

the fixing belt according to claim 5;

a rotary member that is arranged in contact with an outer peripheral surface of the fixing belt; and a pressing member that is arranged on inside of the fixing belt and presses the fixing belt on the rotary member from an inner peripheral surface of the fixing belt.

15. A fixing device comprising:

the fixing belt according to claim 6;

a rotary member that is arranged in contact with an outer peripheral surface of the fixing belt; and a pressing member that is arranged on inside of the fixing belt and presses the fixing belt on the rotary member from an inner peripheral surface of the fixing belt.

16. A fixing device comprising:

the fixing belt according to claim 7;

a rotary member that is arranged in contact with an outer peripheral surface of the fixing belt; and a pressing member that is arranged on inside of the fixing belt and presses the fixing belt on the rotary member from an inner peripheral surface of the fixing belt.

17. A fixing device comprising:

the fixing belt according to claim 8;

a rotary member that is arranged in contact with an outer peripheral surface of the fixing belt; and a pressing member that is arranged on inside of the fixing belt and presses the fixing belt on the rotary member from an inner peripheral surface of the fixing belt.

18. A fixing device comprising:

the fixing belt according to claim 9;

a rotary member that is arranged in contact with an outer peripheral surface of the fixing belt; and a pressing member that is arranged on inside of the fixing belt and presses the fixing belt on the rotary member from an inner peripheral surface of the fixing belt.

19. An image forming apparatus comprising:

an image holder;

a charging device that charges a surface of the image holder;

a latent image forming device that forms a latent image on the charged surface of the image holder;

a developing device that develops the latent image with a toner to form a toner image;

a transfer device that transfers the toner image to a recording medium; and the fixing device according to claim 10 that fixes the toner image to the recording medium.

20. An image forming apparatus comprising:

an image holder;

a charging device that charges a surface of the image holder;

a latent image forming device that forms a latent image on the charged surface of the image holder;

a developing device that develops the latent image with a toner to form a toner image;

a transfer device that transfers the toner image to a recording medium; and the fixing device according to claim 11 that fixes the toner image to the recording medium.

* * * * *